United States Patent
Jozaki et al.

(10) Patent No.: US 7,169,070 B2
(45) Date of Patent: Jan. 30, 2007

(54) TRANSMISSION CONTROLLER OF V-BELT TYPE CONTINUOUSLY VARIABLE AUTOMATIC TRANSMISSION

(75) Inventors: Tateki Jozaki, Kanagawa-ken (JP); Shigeru Ishii, Kanagawa-ken (JP); Tatsuo Wakahara, Kanagawa-ken (JP); Masahiro Yamamoto, Kanagawa-ken (JP); Hiroyasu Tanaka, Kanagawa-ken (JP); Youhei Ishikawa, Kanagawa-ken (JP)

(73) Assignee: Jatco Ltd. (JP)

( * ) Notice: Subject to any disclaimer, the term of this patent is extended or adjusted under 35 U.S.C. 154(b) by 559 days.

(21) Appl. No.: 10/670,399

(22) Filed: Sep. 26, 2003

(65) Prior Publication Data

US 2005/0192153 A1 Sep. 1, 2005

(30) Foreign Application Priority Data

Sep. 27, 2002 (JP) ............................. 2002-284245

(51) Int. Cl.
*F16H 61/02* (2006.01)
*F16H 61/06* (2006.01)

(52) U.S. Cl. .......................................... 474/28; 474/18
(58) Field of Classification Search ................. 474/18, 474/28; 477/44–50, 39, 99; 701/112, 113
See application file for complete search history.

(56) References Cited

U.S. PATENT DOCUMENTS

| 4,718,308 | A | * | 1/1988 | Haley | ........................... 474/28 |
|---|---|---|---|---|---|
| 4,890,516 | A | * | 1/1990 | Suzuki | ......................... 477/46 |
| 5,431,602 | A | * | 7/1995 | Hendriks et al. | .............. 474/28 |
| 5,527,232 | A | * | 6/1996 | Seidel et al. | ................... 477/46 |
| 6,591,177 | B1 | | 7/2003 | Loffler | |
| 6,602,160 | B2 | * | 8/2003 | Tsutsui | ......................... 477/44 |
| 2001/0049315 | A1 | | 12/2001 | Tsutsui | |
| 2002/0086768 | A1 | * | 7/2002 | Kim | ............................ 477/45 |
| 2002/0116113 | A1 | * | 8/2002 | Kaneko | ...................... 701/112 |

FOREIGN PATENT DOCUMENTS

| EP | 1 403 568 | | 3/2004 |
|---|---|---|---|
| JP | 05-087221 | | 4/1993 |
| JP | 08-312741 | | 11/1996 |
| JP | 08-326855 A | * | 12/1996 |
| JP | 09-250370 A | * | 9/1997 |
| JP | 09-292009 A | * | 11/1997 |
| JP | 09-329228 | | 12/1997 |

* cited by examiner

Primary Examiner—Marcus Charles
(74) Attorney, Agent, or Firm—Blank Rome LLP

(57) ABSTRACT

There are provided with a determination means for determining whether or not the correlation between the pressure value detected by the primary pressure sensor and the pressure value detected by the secondary pressure sensor is an actually impossible relation (Step 5), and a switchover means for switching over to an open control while prohibiting a feedback control when the correlation is determined to have become a relation actually impossible by the determination means (Step 6). Presence or absence of a fault to the primary pressure sensor or the secondary pressure sensor (particularly, fault of fixed output voltage) is judged based on the correlation between the output voltage of the primary pressure sensor and the output voltage of the secondary pressure sensor to prohibit the control of a primary pressure and a secondary pressure using the hydraulic pressure sensors when it is judged that there is a fault.

15 Claims, 5 Drawing Sheets

TRANSMISSION CONTROLLER OF V-BELT TYPE CONTINUOUSLY VARIABLE AUTOMATIC TRANSMISSION

BACKGROUND OF THE INVENTION

The present invention relates to a transmission controller of a V-belt type continuously variable automatic transmission.

Conventionally, a V-belt type continuously variable automatic transmission, wherein the transmission gear ratio of vehicles such as cars is continuously changed by regulating the groove widths of a pair of pulleys (a primary pulley on the drive side and a secondary pulley on the driven side) over which a V-belt is traversed. Conventionally, as disclosed in Japanese Laid-Open (Kokai) Patent Application (A) numbered Heisei 4-272569 (1992) titled "HYDRAULIC CONTROL DEVICE FOR CONTINUOUSLY VARIABLE TRANSMISSION."

The groove widths of the primary pulley and the secondary pulley are designed to change in response to the supplied hydraulic pressure (a primary pressure and a secondary pressure) to the cylinder chambers (the primary cylinder chamber and the secondary cylinder chamber) provided in combination with each pulley. The primary pressure and the secondary pressure are controlled so as to be the target primary pressure and the target secondary pressure according to the operational status while using the line pressure generated by the hydraulic pump as the main pressure. In addition, although there is also provided a V-belt type continuously variable automatic transmission wherein the line pressure is used as the secondary pressure as it is, in order to simplify these specifications, it is assumed in the present invention that the secondary pressure is also generated using the line pressure as the main pressure similar to the case of the primary pressure.

Here, with the conventional transmission controller of a V-belt type continuously variable automatic transmission, the target primary pressure and the target secondary pressure are determined in response to the operational status at that time, based on the detected signals transmitted from the operational status detection means, such as sensors to detect the revolution speed of each pulley. Further, by finding the deviations between the values of the detected signals transmitted from the primary pressure sensor to detect the actual primary pressure (hereinafter referred to as "the actual primary pressure") and the secondary pressure sensor to detect the actual secondary pressure (hereinafter referred to as "the actual secondary pressure") at that time and the values of the target pressures (the target primary pressure and the target secondary pressure), the aforementioned actual pressures (the actual primary pressure and the secondary pressure) are feedback controlled to eliminate their deviations. For example, as disclosed in Japanese Laid-Open (Kokai) Patent Application (A) numbered 2001-34918 titled "HYDRAULIC CONTROL DEVICE OF CONTINUOUSLY VARIABLE TRANSMISSION."

Here, if the primary pressure deviation or the secondary pressure deviation is too high, the groove widths of the pulleys become unsuitable during the period until the actual primary pressure is converged on the target primary pressure or the actual secondary pressure is converged on the target secondary pressure. For instance, when the groove widths of the pulleys are too wide, the pinching and gripping force of the V-belt is insufficient which causes the V-belt to slip. The resultant disadvantage is reduced durability of the V-belt.

Then, in the conventional transmission controller of the V-belt type continuously variable automatic transmission, if the primary pressure deviation or the secondary pressure deviation is higher than the predetermined threshold value, the system judges that there is a possibility whereby slipping may take place on the V-belt. The aforementioned "convergence" is designed to be expedited by adding a predetermined compensation quantity to the control value of the line pressure which is the main pressure of the primary pressure and the secondary pressure to control the primary pressure or the secondary pressure on an increment side higher than the normal value.

SUMMARY OF THE INVENTION

Conversely, with the conventional transmission controller of the V-belt type continuously variable automatic transmission, of the faults of the primary pressure sensor and the secondary pressure sensor, a fault taking place in the range of the normal voltage is not considered. For example, if "fault of fixed output voltage" takes place in either or both sensors, a correct feedback control can not be performed. Especially if the output value of the secondary pressure sensor is higher than the value corresponding of the actual pressure, there is a problem that the secondary pressure is excessively decreased to cause the V-belt to slip, thereby damaging and reducing the durability of the V-belt.

Here, "fault of fixed output voltage" means a fault that the voltage is fixed at a predetermined electric potential in the range of the normal output voltage of the sensor (for example, fixed at 2V in the range of the normal output voltage of 0.5 to 4.5V) and a fault that a case can not be judged to be faulty by merely observing an output voltage (since the voltage is within the range of the normal output voltage of the sensor, it is judged to be apparently normal). Generally, the hydraulic pressure sensor used for the primary pressure sensor and the secondary pressure sensor catches the pressure change of the pressure receiving section made of a ceramic plate or the like as a change in electrostatic capacity and the change is converted into direct current to take it out. In this case, a trouble of the fixed output voltage may take place like the foregoing since the electrostatic capacity remains unchanged (it becomes a fixed value), if the pressure receiving section is physically damaged (the ceramic plate is damaged or the like).

Then, the present invention is intended to eliminate the foregoing problem by judging whether or not there is a fault in the primary pressure sensor or the secondary pressure sensor (particularly, a fault of the fixed output voltage) based on correlation between the output voltage of the primary pressure sensor and that of the secondary pressure sensor, and by prohibiting the control of the primary pressure and the secondary pressure using their hydraulic pressure sensors if it is judged that there is a fault therein.

In order to achieve the above purpose, the present invention is applied to a V-belt type continuously variable automatic transmission provided with a primary pressure sensor and a secondary pressure sensor which detect the pressure value of the primary pressure supplied to a cylinder chamber of a drive pulley and the pressure value of the secondary pressure supplied to a cylinder chamber of a driven pulley respectively, and a hydraulic pressure controller which performs a feedback control so as to allow the pressure values detected by each of the sensors to match with a target secondary pressure and a target primary pressure computed in response to the operational status. The features thereof are that the system determines whether or not the correlation between the pressure value corresponding to the primary pressure and the pressure value corresponding to the secondary pressure is an actually impossible relation, if it is determined that the aforementioned correlation is an actually impossible relation, the system prohibits the aforementioned feedback control to switchover to an open control.

In the invention, when the correlation between the pressure value detected by the primary pressure sensor and the pressure value detected by the secondary pressure sensor becomes an actually impossible relation, the system determines the fault of the primary pressure sensor or the secondary pressure sensor (particularly, the fault of the fixed output voltage) to prohibit the control of the primary pressure and the secondary pressure using these hydraulic pressures.

According to the invention, when the correlation between the pressure value detected by the primary pressure sensor and the pressure value detected by the secondary pressure sensor becomes an actually impossible relation, the primary pressure sensor or the secondary pressure sensor is determined to be faulty and the control using the pressure values of these hydraulic pressure sensors is prohibited. Therefore, particularly "fault of fixed output voltage," where the determination of fault has been impossible by merely observing the output of a sensor, becomes capable of being correctly determined, and an adverse affection upon the continuously variable automatic transmission by continuously performing a control based on the pressure value of the sensor with "fault of fixed output voltage."

According to the invention, when the correlation between the pressure value detected by the primary pressure sensor and the pressure value detected by the secondary pressure sensor becomes an actually impossible relation, primary pressure sensor or the secondary pressure sensor is determined to be "faulty of fixed output voltage" and the feedback control which allows the primary pressure detected by the primary pressure sensor to match with the target primary pressure is prohibited to switchover to the open control. Therefore, when the pressure value of the secondary pressure sensor is higher than a value corresponding to the actual pressure, the secondary pressure can be prevented from being excessively reduced by continuing the feedback control. As a result, this can definitely prevent damage to the durability of the V-belt caused by slipping of the belt.

In the concept of the present invention, the terminology "transmission gear ratio" hereinafter is synonymous in meaning with various translations such as "change gear ratio," "shifting gear ratio" and "speed change ratio."

According to the invention, the control can be performed only under the situation that the balance relation between the primary pressure and the secondary pressure is normally established to prevent false detection. Namely, when the transmission gear ratio is not within a predetermined range, there may be also a case where a hydraulic pressure is not generated (for example, although not illustrated, there may be also a transmission condition where the transmission torque of the belt on the primary side is secured by a mechanical stopper 70 under no primary pressure), and the balance relation is not established under the transmission situation. Therefore, "fault of fixed output voltage" is judged based on the deviation of the balance relation in spite of the normal work of the sensor. Then, by introducing the condition, misjudgment of the situation to be "fault of fixed output voltage" is prevented.

According to the invention, the control can be performed only under the situation that the balance relation between the primary pressure and the secondary pressure is normally established to prevent false detection. Namely, under a situation that a vehicle is stopped, there may be a case where the primary pressure is not generated and further, the balance relation is not established under the situation. Therefore, "fault of fixed output voltage" is misjudged based on the deviation of the balance relation in spite of the normal work of the sensor. Then, by introducing the condition, misjudgment of the situation to be "fault of fixed output voltage" is prevented.

According to the invention, the false detection of "fault of fixed output voltage" can be prevented. Namely, in the mechanism, the primary pressure is never higher than the line pressure which is the main pressure. Therefore, by excluding the situation where the detected value of the primary pressure sensor is clearly abnormal, misjudgment of "fault of fixed output voltage" in spite of the normal work of the secondary pressure sensor can be prevented.

According to the invention, the control can be performed only under the situation that the balance relation between the primary pressure and the secondary pressure is normally established to prevent false detection. Namely, when the transmission gear ratio control is under a transient state, sometimes the balance relation between the primary pressure and the secondary pressure is not established temporarily. Therefore, "fault of fixed output voltage" is misjudged based on the deviation of the balance relation in spite of the normal work of the sensor. Then, by introducing the condition, misjudgment of the state to be "fault of fixed output voltage" is prevented.

According to the invention, the control can be performed when all the conditions above are met, false detection can be further prevented.

According to the invention, the certainty of judgment of "fault of fixed output voltage" in spite of the normal work of the hydraulic pressure sensor can be increased.

Further, according to the invention, a method for controlling the transmission controller of a V-belt type continuously variable automatic transmission equipped with a primary pressure sensor and a secondary pressure sensor for detecting the pressure value of the primary pressure supplied to the cylinder chamber of a drive pulley and the pressure value of the secondary pressure supplied to the cylinder chamber of a driven pulley; a hydraulic pressure controller for controlling the primary pressure and the secondary pressure based on the pressure value and operational status detected by the sensors comprises the step of judging whether or not the correlation between the pressure value corresponding to the primary pressure and the pressure value corresponding to the secondary pressure is actually an impossible relation; and determining the state as either having failed at least among the primary pressure sensor or the secondary pressure sensor when the judging step determines the correlation to be an actually impossible relation.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE INVENTION

The present invention will hereinafter be described in detail with reference to the preferred embodiments shown in the accompanying drawings.

Figure 1:
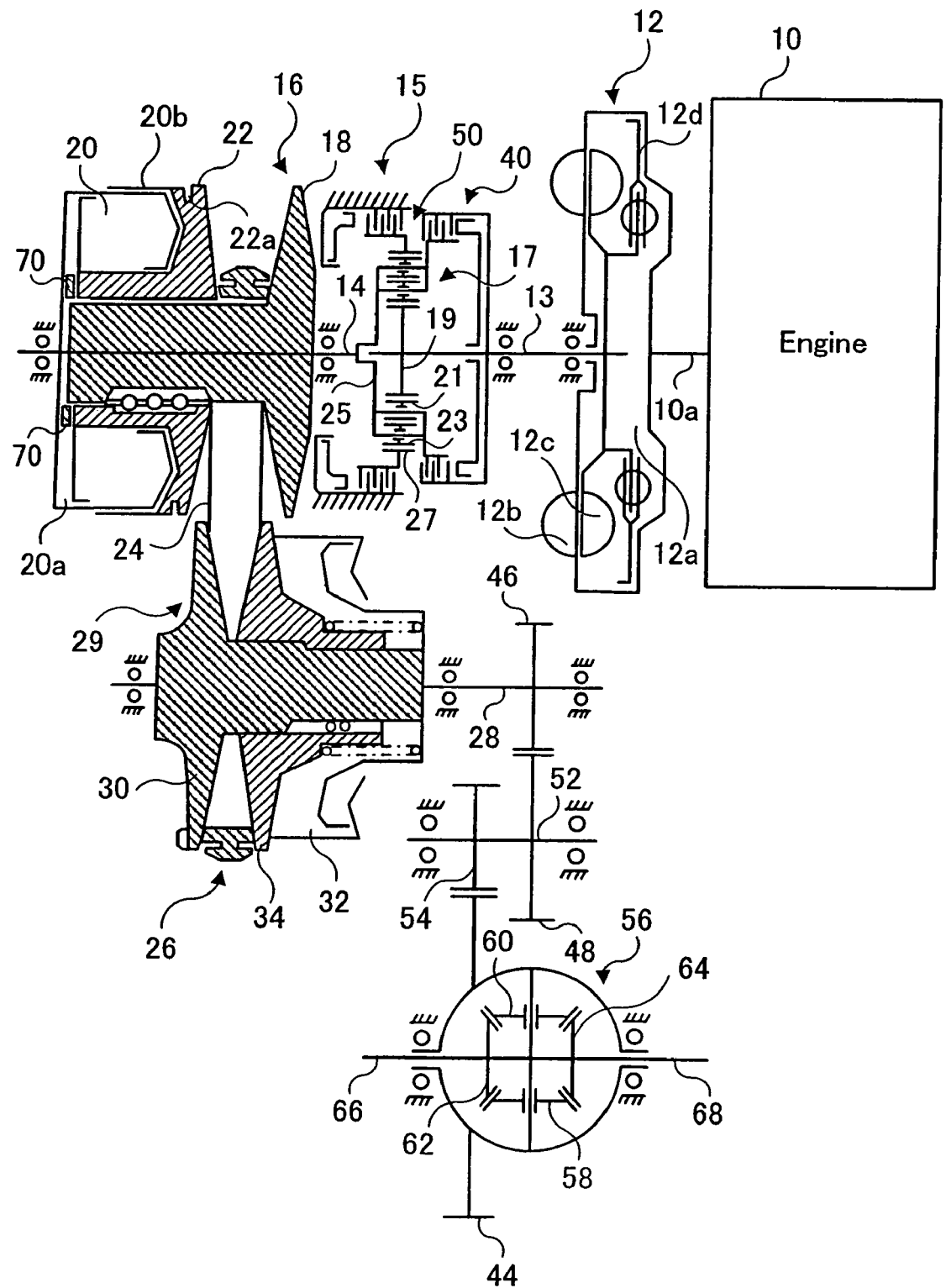
FIG. 1 is a skeleton diagram showing the power transmission mechanism of the V-belt type continuously variable automatic transmission according to an embodiment of the invention.

FIG. 1 is a skeleton diagram showing the power transmission mechanism of the V-belt type continuously variable automatic transmission according to an embodiment of the invention. In the figure, a torque converter 12 is coupled to an output axis 10a of an engine 10. The torque converter 12 is provided with a lock-up mechanism, controlling the hydraulic pressure of the lock-up oil chamber 12a to allow a pump impeller 12b on the input side and a turbine liner 12c on the output side to be mechanically coupled or uncoupled.

The output side of the torque converter 12 is coupled to a rotational axis 13, which is coupled to a forward/backward switchover mechanism 15 having a planet gear mechanism 17, a forward clutch 40 and a backward brake 50.

The planet gear mechanism 17 is constituted of a sun gear 19, a pinion carrier 25 having two pinions 21 and 23 and an internal gear 27. The two pinion gears 21 and 23 are mutually meshed, the pinion gear 21 is meshed with the sun gear 19, and the pinion gear 23 is meshed with the internal gear 27. The sun gear 19 is coupled so as to rotate always integrally with the rotational axis 13. The pinion carrier 25 can be coupled to the rotational axis 13 with the forward clutch 40 and in addition, the internal gear 27 can be fixed to a stationary section with the backward brake 50. The pinion carrier 25 is coupled to a drive axis 14 disposed on the periphery of the rotational axis 13 and the drive axis 14 is provided with a primary pulley (also called a drive pulley) 16.

The primary pulley 16 is constituted of a fixed conical plate 18 which integrally rotates with the drive axis 14 and a movable conical plate 22 which is disposed opposite to the fixed conical plate 18 to form a V-shaped pulley groove and can be moved in the axial direction of the drive axis 14 by hydraulic pressure (a primary pressure) acting on the primary pulley cylinder chamber 20. The primary pulley cylinder chamber 20 comprises two chambers of chambers 20a and 20b and has a pressure receiving area twice as much as a secondary pulley cylinder chamber 32 described later. The primary pulley 16 is transmittably coupled to the secondary pulley (also called a driven pulley) 26 by a V-belt 24.

The secondary pulley 26 is provided on the driven axis 28, and is constituted of a stationary conical plate 30 which rotates integrally with the driven axis 28 and the movable conical plate 34 which is disposed opposite to the stationary conical plate 30 to form a V-shaped pulley groove and can be moved in the axial direction of the driven axis 28 by the hydraulic pressure (the secondary pressure) acting on the secondary pulley cylinder chamber 32. The primary pulley 16, the V-belt and the secondary pulley 26 constitute the V-belt type continuously variable automatic transmission 29.

A drive gear 46 is fixed to the driven axis 28. The drive gear 46 is meshed with an idler gear 48 on an idler axis 52, and a pinion gear 54 provided on the idler axis 52 is always meshed with a final gear 44. A pair of pinion gears 58 and 60 which constitute a differential gear 56 are mounted on the final gear 44; these pinion gears 58 and 60 are meshed with a pair of side gears 62 and 64; and the side gears 62 and 64 are connected to output axes 66 and 68 respectively.

A rotational force inputted into the power transmission mechanism as described above from the output axis 10a of the engine 10 is transmitted to the forward/backward switchover mechanism 15 through the torque converter 12 and the rotational axis 13. Then, when the forward clutch 40 is engaged and the backward brake 50 is released, the rotational force of the rotational axis 13 is transmitted to the drive axis 14 while keeping the same rotational direction as it stands through the planet gear mechanism 17 that remains in an integrally rotational condition. On the other hand, when the forward clutch 40 is released and the backward brake 50 is engaged, the rotational force of the rotational axis 13 is transmitted to the drive axis 14 in a state of reverse rotational direction by the action of the planet gear mechanism 17.

The rotational force of the drive axis 14 is transmitted to the differential gear 56 through the primary pulley 16, the V-belt 24, the secondary pulley 26, the driven axis 28, the drive gear 46, the idler gear 48, the idler axis 52, the pinion gear 54 and the final gear 44 to rotate the output axes 66 and 68 in the forward direction or in the backward direction. In the case where both the forward clutch 40 and the backward brake 50 are released, the power transmission mechanism remains in a neutral condition.

In the case of the power transmission as above-mentioned, by moving the movable conical plate 22 of the primary pulley 16 and the movable conical plate 34 of the secondary pulley 26 in the axial direction to change the radius of the contacting position with the V-belt 24, the rotation ratio of the primary pulley 16 and the secondary pulley 26 can be changed. For example, when the width of the V-shaped pulley groove in the primary pulley 16 (hereinafter merely referred to as "the groove width") is increased and the width of the V-shaped pulley groove in the secondary pulley 26 (hereinafter merely referred to as "the groove width") is decreased, the radius of the contacting position of the V-belt on the side of the primary pulley 16 decreases and the radius of the contacting position of the V-belt on the side of the secondary pulley 26 increases, resulting in a higher transmission gear ratio. Or, when the movable conical plates 22 and 34 are moved in a reverse direction, a smaller transmission gear ratio can be obtained, which is utterly opposite to the foregoing.

Next, the hydraulic pressure controller of the V-belt type continuously variable automatic transmission will be described.

Figure 2:
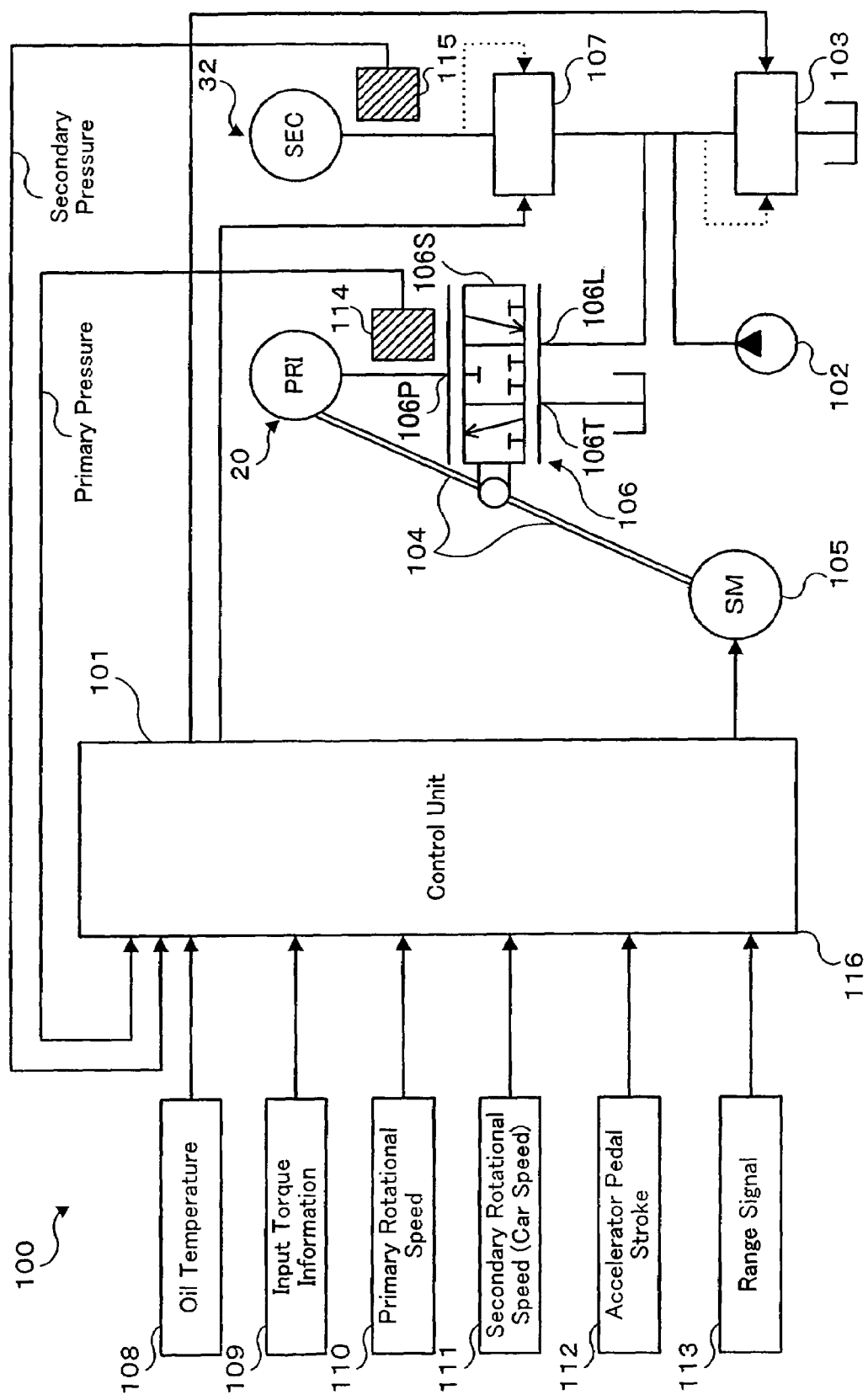
FIG. 2 is an entire conceptual block diagram of the hydraulic pressure controller.

FIG. 2 is an entire conceptual block diagram of the hydraulic pressure controller. A hydraulic pressure controller 100 is, in short, designed to regulate each hydraulic pressure (the primary pressure and the secondary pressure) of the oil supplied to each cylinder chamber (the primary pulley cylinder chamber 20 and the secondary pulley cylinder chamber 32) of the primary pulley 16 and the secondary pulley 26 and change the groove widths of the secondary pulley 26 and the primary pulley 16 to achieve a proper transmission gear ratio which complies with the operational status.

In order to achieve the function, the hydraulic pressure controller 100 is provided with a control unit 101 which performs an overall control of the hydraulic pressure system of the V-belt type continuously variable automatic transmission 29 in accordance with the operational status, a regulator valve 103 which regulates the line pressure generated in a hydraulic pump 102 according to a command signal from the control unit 101, a step motor 105 which rotates according to a command signal from the control unit 101 and reciprocatingly drives a servo link 104, a ratio change control valve 106 which controls the primary pressure in response to the reciprocation of the servo link 104, and a reducing valve 107 which regulates the secondary pressure according to a command signal from the control unit 101. In addition, there is also another system constitution not provided with the reducing valve 107, namely, the line pressure as it stands is used as the secondary pressure.

The ratio change control valve 106 is provided with a primary port 106P which is communicated with the primary pulley cylinder chamber 20, a line pressure port 106L to which the line pressure is supplied, a drain port 106T, and a spool 106S which switchovers the communications between these ports.

The spool 106S is coupled to the servo link 104, both ends of the servo link 104 being coupled to the step motor 105 and the movable conical plate 22 of the primary pulley 16 respectively. The position of the spool 106S is determined to be a reciprocation position of the servo link 104, namely, either of the following three positions (a first to a third positions) depending on the rotational angle of the step motor 105 and the groove width of the primary pulley 16.

The first position is a position which closes the line pressure port 106L and communicates between the primary port 106P and the drain port 106T. The second position is a position which closes the drain port 106T and communicates between the primary port 106P and the line pressure port 106L. The third position is a position which closes each port (the primary port 106P, the line pressure port 106L and the drain port 106T).

Therefore, the ratio change control valve 106 acts as a so-called three-position valve which suitably switchovers the above first to the third positions so as to allow the groove width of the primary pulley 16 corresponding to the actual transmission gear ratio to be a mechanical feedback value and allow the feedback value (the groove width of the primary pulley 16) to be a target transmission gear ratio in response to the rotational quantity of the step motor 105.

As described above, the control unit 101 performs an overall control over the hydraulic pressure system of the V-belt type continuously variable automatic transmission 29 in response to the operational status, and the parameters indicating the operational status, for example, include the hydraulic temperature of the hydraulic pressure system of the V-belt type continuously variable automatic transmission 29, the input torque from the engine 10, the rotational speed of the primary pulley 16 (the primary rotational speed), the rotational speed of the secondary pulley 26 (the secondary rotational speed or the car speed), the stepping stroke of the accelerator pedal (or the throttle opening), the range position of the automatic selector (such as P, N, D, 2, 1) and the like as well as the primary pressure and the secondary pressure.

These parameters are detected by switches, sensors or the like each mounted at the proper places. For example, the oil temperature is detected by oil temperature sensor 108 mounted in the channel of the line pressure, and input torque information is given in the form of a fuel injection amount or an engine rotation number and the like from engine control unit 109. In addition, the primary rotational speed is detected by a rotation sensor 110 provided in combination with the primary pulley 16, and the secondary rotational speed is detected by a rotation sensor 111 provided in combination with the secondary pulley 26. The stepping-in stroke of the accelerator pedal stroke is detected by a stroke sensor 112 provided in combination with the accelerator pedal (not illustrated), and the range position of the automatic transmission selector is detected by an inhibitor switch 113. Further, the primary pressure is detected by a primary pressure sensor 114 provided in combination with the primary pulley cylinder chamber 20, and the secondary pressure is detected by a secondary pressure sensor 115 provided in combination with the secondary pulley cylinder chamber 32.

The control unit 101 realizes following functions, for example, by executing a predetermined control program using a microcomputer, though a means is not limited particularly. That is, it realizes "the transmission gear ratio control function" as a first function, wherein a target transmission gear ratio is determined in response to the car speed or the accelerator pedal stroke and, to realize the target transmission gear ratio, the step motor 105 is driven to control the diameter ratio of the primary pulley 16 and the secondary pulley 26 (namely, the actual transmission gear ratio); and "the hydraulic pressure control function" as a second function, wherein the opening/closing of the regulator valve 103 or the reducing valve 107 is duty controlled in response to the oil temperature, the primary pressure, the secondary pressure, the input torque, the primary rotational speed, the secondary rotational speed and the like, and the line pressure is regulated or the secondary pressure that uses the line pressure as the main pressure is regulated to control the thrusts of the primary pulley 16 and the secondary pulley 26 (the pinching and holding power of the V-belt 24).

Figure 3:
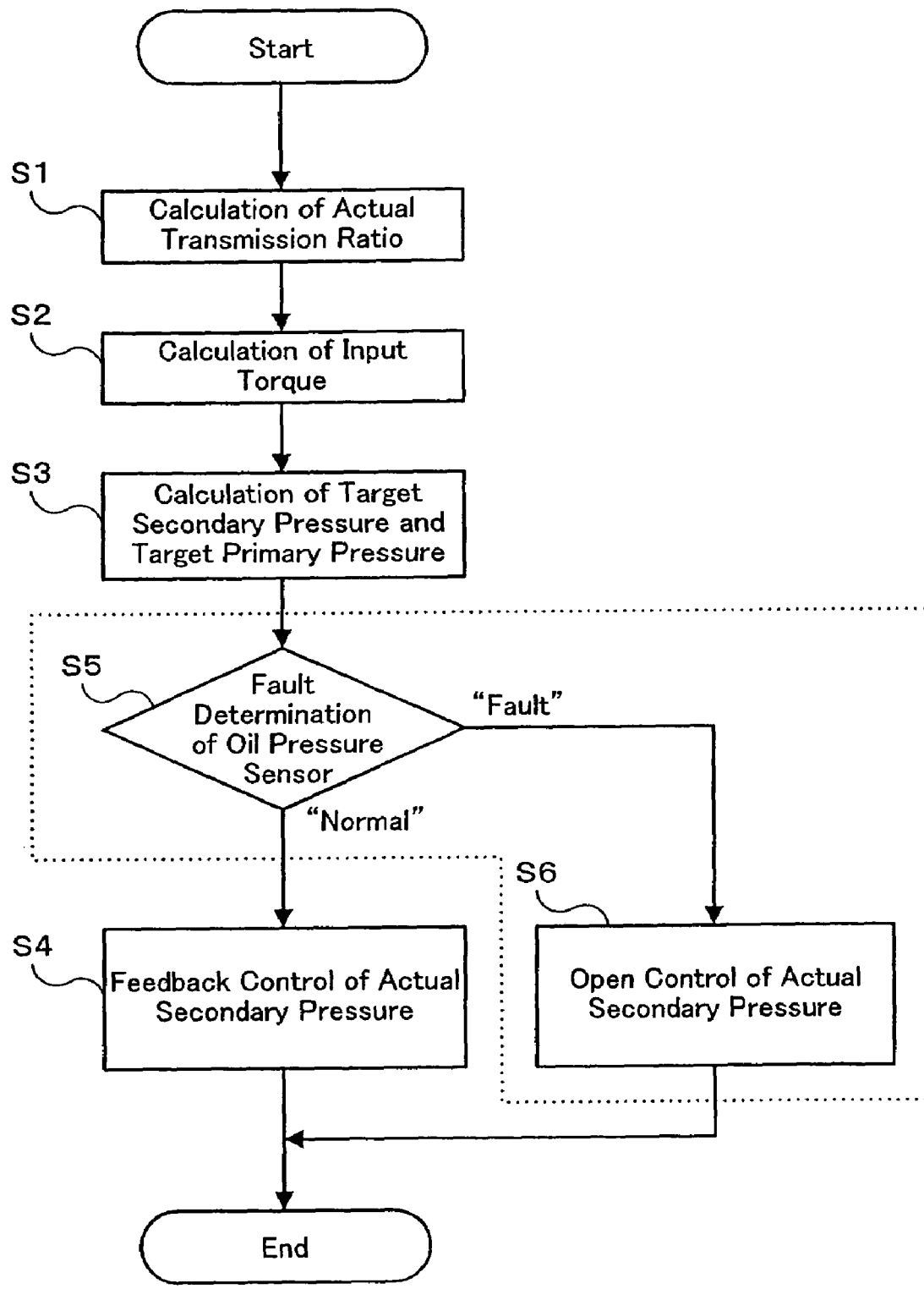
FIG. 3 is a diagram showing the flow chart of the hydraulic pressure control function.

Out of functions, below described is "the hydraulic pressure control function", which is closely related to the subject according to the invention. As shown in FIG. 3, generally the control unit 101 repeats periodically the execution of processing of the following Step S1 to Step S4 (or Step S1 to Step S3 and Step S5 and Step S6).

(Step S1)

The actual transmission gear ratio of the V-belt type continuously variable automatic transmission 29 is calculated from the ratio of the primary rotational speed and the secondary rational speed.

(Step S2)

The input torque of the V-belt type continuously variable automatic transmission 29 is calculated from the input torque information.

(Step S3)

Figure 4A:
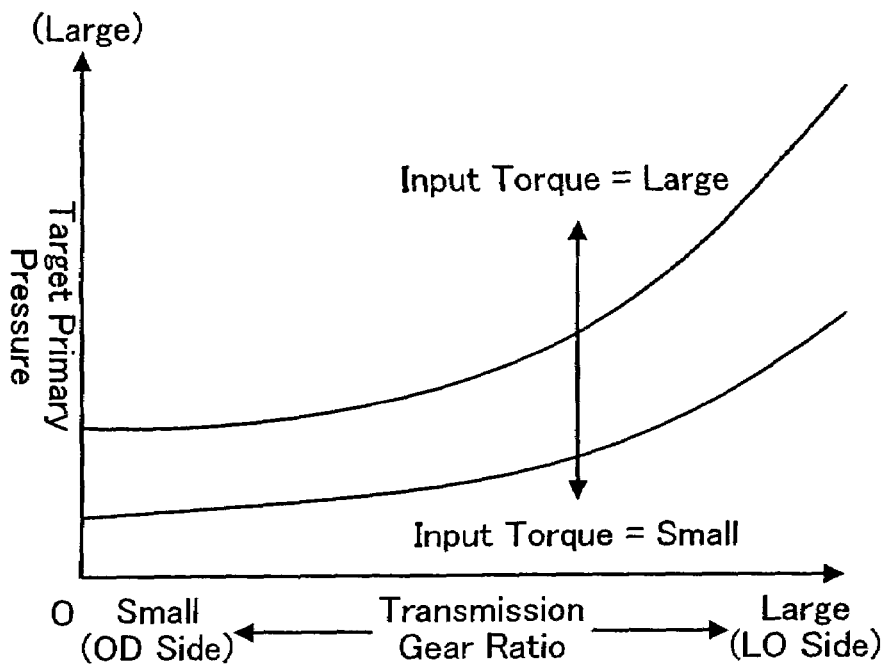
FIGS. 4A and 4B are the operation characteristic diagrams of the target primary pressure and the target secondary pressure.
Figure 4B:
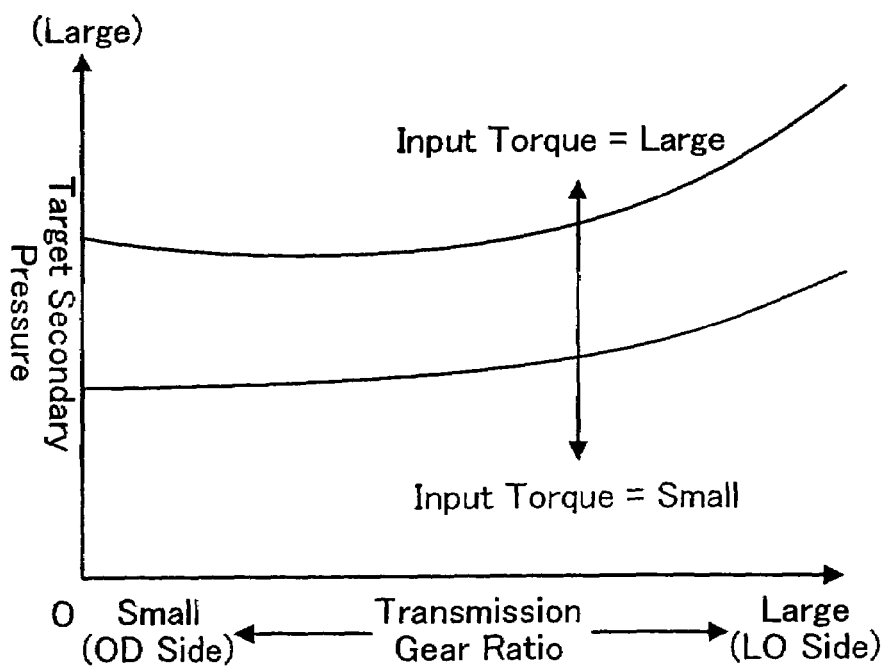

The target secondary pressure and the target primary pressure are calculated based on the aforementioned actual transmission gear ratio and input torque. The calculation characteristics of the target secondary pressure and the target primary pressure, as shown in FIGS. 4A and 4B, for example, is designed such that smaller the transmission gear ratio in overdrive (OD side) is, the oil pressure is set at a lower pressure, and larger the transmission gear ratio in low "gear" (LO side) is, the hydraulic pressure is set at a higher pressure; and that larger the input torque is, the hydraulic pressure is set at a higher pressure, and smaller the input torque is, the hydraulic pressure is set at a lower pressure. Also, the target primary pressure is set in relation to the target secondary pressure with such characteristics that the hydraulic pressure is relatively higher on a small transmission gear ratio side and the hydraulic pressure is relatively lower on a large transmission gear ratio side. But, the high and low relation between the target primary pressure and the target secondary pressure may be reversed depending upon the input torque.

(Step S4)

The feedback control of the secondary pressure is executed by driving the regulator valve 103 (or the reducing valve 107 if required) so as to allow the actual secondary pressure detected by the secondary pressure sensor 115 to be the target secondary pressure.

By the way, the foregoing processing from Step S1 to Step S4 has been publicly known. Namely, it is conventionally publicly known that the target secondary pressure and the target primary pressure are found from the operational status so as to feedback-control the actual secondary pressure detected by the secondary pressure sensor 115 to match with the target secondary pressure.

However, the embodiment is distinguished from the conventional technology in point of including two specific steps below.

(Step S5)

It is determined that whether or not the correlation between the actual secondary pressure detected by the secondary pressure sensor 115 and the actual primary pressure detected by the primary pressure sensor 114 is an actually impossible relation to determined that, if the correlation is an impossible relation, a fault has occurred to a hydraulic pressure sensor (the secondary pressure sensor 115 or the primary pressure sensor 114).

Figure 5:
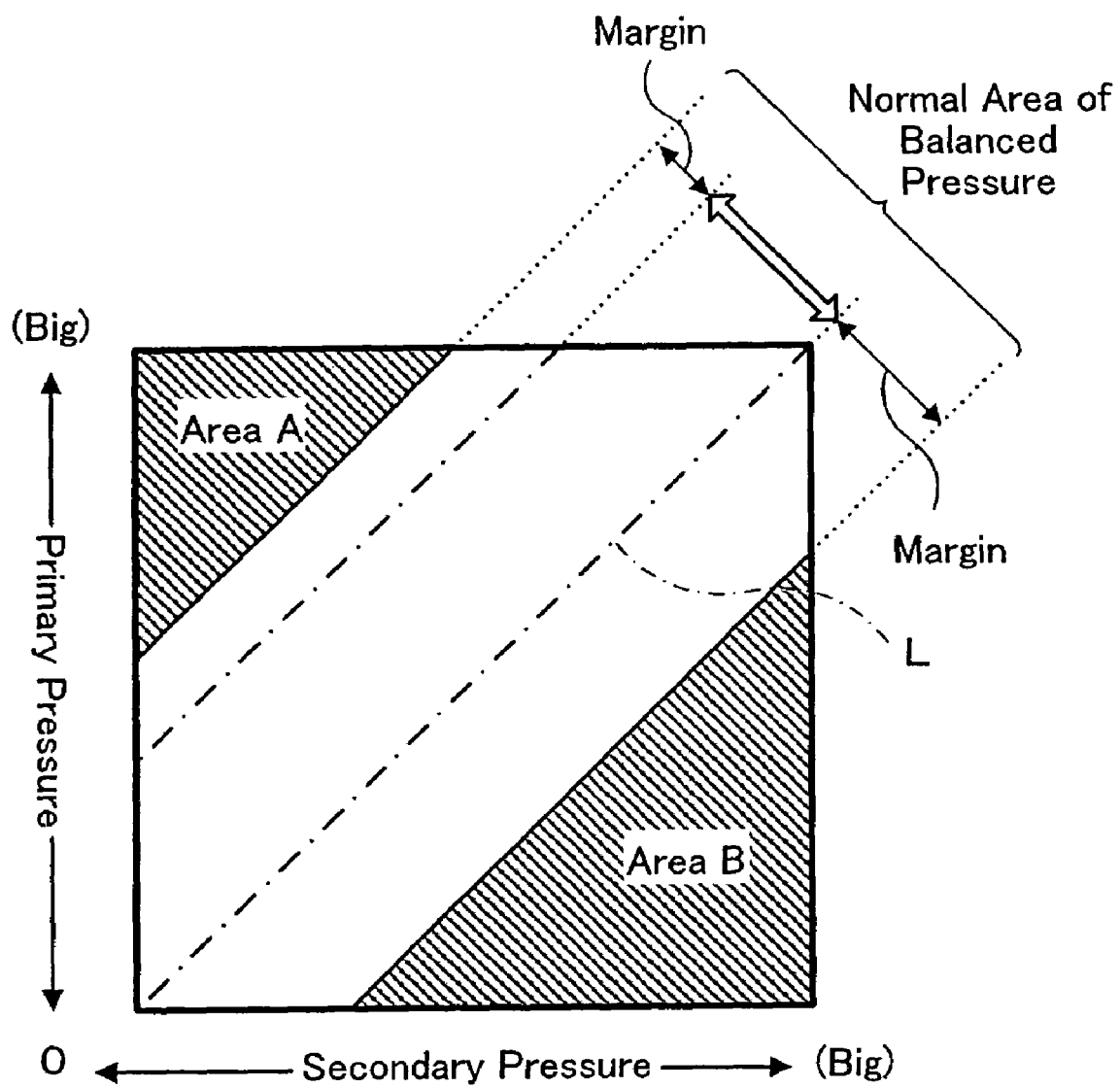
FIG. 5 is a diagram showing the determination map used for fault determination of the hydraulic pressure sensor.

FIG. 5 is a diagram showing the determination map used for fault determination of the hydraulic pressure sensor. In the map, the vertical axis is for the primary pressure, the horizontal axis is for the secondary pressure, the upper side of the vertical axis means the high pressure side and the right side of the horizontal axis means the high pressure side. It is designed that, when arbitrary values of the secondary pressure and the primary pressure are given to this map, the coordinate point in the map corresponding to these values is looked up.

Here, the two areas (areas A, B) as shown in hatching in the map are the fault determination areas indicating the relation between the secondary pressure and the primary pressure which are actually impossible, and the map area other than the areas in hatching is the normal area of the balanced pressure described later. If the coordinates are located in the area A or B, it is determined that a fault has occurred to the hydraulic pressure sensor (the secondary pressure sensor 115 or the primary pressure sensor 114), and when the coordinates are located in the map area other than the area A or B (the normal area), it is determined that a fault has not occurred to the hydraulic pressure sensor (the secondary pressure sensor 115 or the primary pressure sensor 114). The area A is an area where the primary pressure is high and the secondary pressure is low, and the area B is an area where the secondary pressure is high- and the primary pressure is low.

Generally, the V-belt type continuously variable automatic transmission controls the winding condition of the V-belt with the pressing force due to both-pulley ratio. For that reason, when the pulley ratio, the transmission torque, the revolution number and the secondary pressure are determined, the primary pressure is incidentally determined so as to balance them. This is called "a balanced pressure". Concretely, the combination of the primary pressure and the secondary pressure which can be set as "a balanced pressure" is mapped, and it is determined that the area outside the mapped range (areas A, B) is of a fault. But, during a ratio change (also referred to as a speed change or variable speed) is excluded from the detection conditions since balancing of the pressures is not kept.

It is desirable that the normal area of the balanced pressure is set by adding the margin of a sensor dispersion portion to a normally settable hydraulic pressure value as shown by an outline arrow in the figure.

The normal area is set, taking the line L where the primary pressure and the secondary pressure are 1:1 as the center, so as to be wider in the direction where the primary pressure is higher than the secondary pressure; and relatively narrower in the direction where the secondary pressure is higher than the primary pressure. The areas are set while taking into consideration the fact that, at the balanced pressure, the secondary pulley rotates at a higher speed on the OD side to allow the required secondary pressure to be a low hydraulic pressure due to the affection of the centrifugal hydraulic pressure, and that the primary pressure that balances under normal conditions is higher than the secondary pressure and the like.

As described above, it is possible to correctly determine "fault of fixed output voltage", especially where it is impossible to determine a fault by merely observing the sensor output voltage, by performing the fail determination of the hydraulic pressure sensors (the primary pressure sensor 114 and the secondary pressure sensor 115) based on the balanced pressure set in this manner.

(Step S6)

When the hydraulic pressure sensor is determined to be faulty, the actual primary pressure detected by the primary pressure sensor 114 or the actual secondary pressure sensor detected by the secondary pressure sensor 115 is no longer liable. For that reason, the feed back control based on the actual primary pressure or the actual secondary pressure should not be performed. Therefore, in Step S6, the actual primary pressure or the actual secondary pressure is controlled by the open loop which does not constitute the feedback loop. For example, the command value of the primary pressure (target primary pressure) is decided to be a higher hydraulic pressure increased by a predetermined amount to the target primary pressure before the feedback component is added when the feedback control was performed. This allows the V-belt to be prevented from slipping even when the hydraulic pressure drops due to the dispersion of the hydraulic pressure circuit or the like.

As is clear from the foregoing, according to the embodiment, when "fault of fixed output voltage" occurs to the primary pressure sensor 114 or the secondary pressure sensor 115, the fault of the sensor can be determined without delay, and the switchover to the open control can be performed by stopping (prohibiting) the feedback control of the actual primary pressure or the actual secondary pressure. Therefore, for example, this allows the system to eliminate a problem that the durability of the V-belt deteriorates due to the slipping of the V-belt, without excessively reducing the primary pressure or the secondary pressure.

Here, in the embodiment described above, the fault determination of the hydraulic pressure sensor (Step S5) is unconditionally performed after the calculation processing is performed on the target secondary pressure and the target primary pressure (Step S3). But, this is intended to show the principle of the invention and, in a practical operation, it is desirable that the fault determination of the hydraulic pressure sensor is performed when the system meets with a part of or all of the following conditions (Condition 1 to Condition 4) (or it has continuously met with them for a predetermined period of time)

(Condition 1)

The actual transmission gear ratio is larger than the limit value of the transmission gear ratio in overdrive (OD side) and smaller than the limit value of the transmission gear ratio in low "gear" (LO side):

By introducing the condition, the control can be performed only under the situation where the balance relation is normally established between the primary pressure and the secondary pressure making it possible to prevent false detection. Namely, when the transmission gear ratio does not stay in a predetermined range, there is also a case where the hydraulic pressure is not generated (for example, there may be a transmission situation that the transfer torque of the belt on the primary side is secured by a mechanical stopper 70 under no primary pressure). Since the balance relation is not established under a ratio change situation like this, it is judged to be "fault of fixed output voltage" based on the deviation of the balance relation in spite of the normal work of the sensor. Then, by introducing the condition, the misjudgment of the situation to be "fault of fixed output voltage" can be prevented. Here, it is preferred that the limit value of the large transmission gear ratio (LO side) is set at a value less than the maximum transmission gear ratio allowable in the mechanism by a predetermined value.

(Condition 2)

A vehicle is in the non-idle state:

By introducing the condition, the control can be performed only under a situation where the balance relation is normally established between the primary pressure and the secondary pressure making it possible to prevent false detection. Namely, under the situation that a vehicle is stopped, there may be a case where the primary pressure is not generated and moreover, since the balance relation is not established under the situation, it is misjudged to be "fault of fixed output voltage" based on the deviation of the balance relation in spite of the normal work of the sensor. Then, by introducing the condition, the misjudgment of the situation to be "fault of fixed output voltage" can be prevented. Here, a stopped or non-idle state of a vehicle is preferably judged such that the vehicle is under the non-idle state when the car speed signal detected by the secondary rotation sensor 111 is a predetermined car speed (for example, 3 km/h) or higher.

(Condition 3)

A vehicle is in a transmission steady-state (in other words, the system is not under a transient state of the transmission gear ratio control):

By introducing the condition, the control can be performed only under a situation where the balance relation is normally established between the primary pressure and the secondary pressure making it possible to prevent false detection. Namely, since there may be a case where the balance relation between the primary pressure and the secondary pressure is temporarily not established under a transient state of the transmission gear ratio control, it is misjudged to be "fault of fixed output voltage" based on the deviation of the balance relation in spite of the normal work of the sensor. Then, by introducing the condition, the misjudgment of the state to be "fault of fixed output voltage" can be prevented. Here, although the judgment of the transmission steady-state or the transmission transient state may be performed in various ways, it is preferred to make judgment in such a manner that the target transmission speed is calculated by differentiating the target transmission gear ratio, which is determined based on the car speed or the acceleration pedal stroke by time to judge that the state is the transmission steady-state when the target transmission speed is equal to the predetermined value or less.

(Condition 4)

The actual primary pressure is lower than the line pressure command hydraulic pressure:

By introducing the condition, a false detection of "fault of fixed output voltage" can be prevented. Namely, since it is impossible in the mechanism that the primary pressure becomes higher than the line pressure which is the main pressure, it is prevented, by excluding the condition that the detected value of the primary pressure sensor 114 is a fault, to misjudge to be "fault of fixed output voltage" in spite of the normal work of the secondary pressure sensor. Here, actually it is preferred to judge that this condition is established when the actual primary pressure value is smaller than the value calculated by adding a predetermined value (for example, 1 MPa) considering the dispersed portion to the line pressure command value, since an solid dispersion or a sensor dispersion is present.

The invention is not limited to the above embodiments only, but includes various modification examples in the scope of its technological idea.

For example, in the above embodiments, when judging the transmission steady-state, a target transmission speed is calculate by differentiating the target transmission gear ratio, which is determined based on the car speed or the acceleration pedal stroke, by time to judge that the state is the transmission steady-state when the target transmission speed is equal to a predetermined value or less. However, it is not limited to this only. In short, it is sufficient if a change in the transmission gear ratio is detected not being high, and the form of detection means or the like is insignificant. For example, in the case where an amount of change in the transmission gear ratio is small in a predetermined time, it may be judged to be "transmission steady-state". Concretely, when the evaluation result of the formula "max (the actual transmission gear ratio, the actual transmission gear ratio before one sample, the actual transmission gear ratio before two samples, - - - , the actual transmission gear ratio before (n) samples)–min (the actual transmission gear ratio, the actual transmission gear ratio before one sample, the actual transmission gear ratio before two samples, - - - , the actual transmission gear ratio before (n) samples)<a predetermined value" is True, it may be judged to be "transmission steady-state". Or, when the amount of change in the target transmission gear ratio is small in a predetermined time, it may be judged to be "transmission steady-state". Concretely, when the evaluation result of the formula "max (the target transmission gear ratio, the target transmission gear ratio before one sample, the target transmission gear ratio before two samples, - - - , the target transmission gear ratio before (n) samples)–min. (the target transmission gear ratio, the target transmission gear ratio before one sample, the target transmission gear ratio before two samples, - - - , the target transmission gear ratio before (n) samples)<a predetermined value" is True, it may be judged to be "transmission steady-state". Or, when the pulley ratio in accordance with the command position of the step motor and the actual pulley ratio are approximately equal, it may be judged to be "transmission steady-state" (it is, however, provided that the step motor is not out of normal conditions).

In addition, although in the above embodiment, as a control in accordance with the pressure value by the hydraulic pressure controller, described is, as the example, a feedback control to perform the feedback control so as to allow the pressure value detected by the secondary pressure sensor to match with the target secondary pressure in response to the operational status, it is not limited to this only. For example, it may be a fail-safe control performed by using the pressure value detected by the secondary pressure sensor.

In addition, although in the above embodiment, described is, as the example, the system where the line pressure is controlled by the reducing valve to generate the secondary pressure and the secondary pressure sensor is disposed between this reducing valve and the secondary pulley cylinder chamber, it may be a system where the line pressure as it stands is used as the secondary pressure.

While the present invention has been described with reference to the preferred embodiments, it is our intention that the invention be not limited by any of the details of the description thereof.

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are intended to be embraced by the claims.

What is claimed is:

1. A transmission controller of a V-belt type continuously variable automatic transmission comprising a primary pressure sensor and a secondary pressure sensor for detecting the pressure value of the primary pressure supplied to the cylinder chamber of the drive pulley and the pressure value of the secondary pressure supplied to the cylinder chamber of the driven pulley respectively, and a hydraulic pressure controller for performing the feedback control so as to allow pressure values detected by each of said sensors to match with the target secondary pressure and the target primary pressure calculated in response to the operational status, wherein:

the transmission controller of a V-belt type continuously variable automatic transmission comprises determination means for determining whether or not correlation between the pressure value corresponding to said primary pressure and the pressure value corresponding to said secondary pressure is a predetermined relation; and said hydraulic pressure controller prohibits the control based on said pressure value when said determination means determines said correlation to be said predetermined relation.

2. The transmission controller of a V-belt type continuously variable automatic transmission according to claim 1, wherein the control based on said pressure value by said hydraulic pressure controller is a feedback control which performs a feedback control so as to allow the pressure value detected by said secondary pressure sensor to match with the target secondary pressure calculated in response to the operational status, and a switchover means is provided to switchover to an open control while prohibiting said feedback control when said determination means determines said correlation to be said predetermined relation.

3. The transmission controller of a V-belt type continuously variable automatic transmission according to claim 1, wherein when said determination means performs said determination when the actual transmission gear ratio is larger than the small transmission gear ratio limit value in overdrive and smaller than the large transmission gear ratio limit value in low gear.

4. The transmission controller of a V-belt type continuously variable automatic transmission according to claim 1, wherein said determination means performs said determination when the vehicle is under a non-idle state.

5. The transmission controller of the V-belt type continuously variable automatic transmission according to claim 1, wherein said determination means performs said determination when an actual primary pressure detected by the primary sensor is lower than the command value of a line pressure which is the main pressure.

6. The transmission controller of a V-belt type continuously variable automatic transmission according to claim 1, wherein said determination means performs said determination under a transmission steady-state.

7. The transmission controller of a V-belt type continuously variable automatic transmission according to claim 1, wherein said determination means performs said determination when all the conditions set forth below are met: when the actual transmission gear ratio is larger than the small transmission gear ratio limit value in overdrive and smaller than the large transmission gear ratio limit value in low gear, when the vehicle is under a non-idle state, when an actual primary pressure detected by the primary sensor is lower than the command value of a line pressure which is the main pressure, and a transmission steady-state.

8. The transmission controller of the V-belt type continuously variable automatic transmission according to claim 1, wherein said hydraulic pressure controller prohibits a control based on said pressure value when said determination means has continuously determined said correlation to be said predetermined relation in a predetermined period of time.

9. A method for controlling the transmission controller of a V-belt type continuously variable automatic transmission equipped with a primary pressure sensor and a secondary pressure sensor for detecting the pressure value of said primary pressure supplied to the cylinder chamber of a drive pulley and said pressure value of said secondary pressure supplied to said cylinder chamber of a driven pulley; a hydraulic pressure controller for controlling said primary pressure and said secondary pressure based on said pressure value and operational status detected by said sensors comprising the step of:

judging whether or not the correlation between the pressure value corresponding to said primary pressure and said pressure value corresponding to said secondary pressure is a predetermined relation; and determining the state as either having failed at least among said primary pressure sensor or said secondary pressure sensor when said judging step determines said correlation to be said predetermined relation.

10. A method according to claim 9, wherein said judging step performs said judgment when the actual transmission gear ratio is larger than the small transmission gear ratio limit value in overdrive and smaller than the large transmission gear ratio limit value in low gear.

11. A method according to claim 9, wherein said judging step performs said judgment when the vehicle is under a non-idle state.

12. A method according to claim 9, wherein said judging step performs said judgment when an actual primary pressure detected by the primary sensor is lower than the command value of a line pressure which is the main pressure.

13. A method according to claim 9, wherein said judging step performs said judgment under a variable speed steady state.

14. A method according to claim 9, wherein said judging step performs said judgment when all the conditions set forth below are met: when the vehicle is under a non-idle state, when an actual primary pressure detected by the primary sensor is lower than the command value of a line pressure which is the main pressure, and a variable speed steady state.

15. A method according to claim 9, wherein said judging step prohibits control based on said pressure value when said judging step has continuously judged said correlation to be said predetermined relation in a predetermined period of time.

* * * * *